Jan. 29, 1924.

J. ABELES 1,482,339

CAMERA ATTACHMENT

Filed March 31, 1923

INVENTOR.
Jules Abeles
BY Frank Keiper
ATTORNEY.

Patented Jan. 29, 1924.

1,482,339

UNITED STATES PATENT OFFICE.

JULES ABELES, OF ROCHESTER, NEW YORK.

CAMERA ATTACHMENT.

Application filed March 31, 1923. Serial No. 629,135.

*To all whom it may concern:*

Be it known that I, JULES ABELES, a citizen of the United States, residing at Rochester, in the county of Monroe and State of New York, have invented certain new and useful Improvements in Camera Attachments, of which the following is a specification.

The object of this invention is to provide a camera with an attachment which enables the use of a smaller film than the size for which the camera is intended for.

This and other objects of this invention will be fully illustrated in the drawing, described in the specification, and pointed out in the claims at the end thereof.

In the accompanying drawing.

In the several figures of the drawing like reference numerals indicate like parts.

Figure 1:
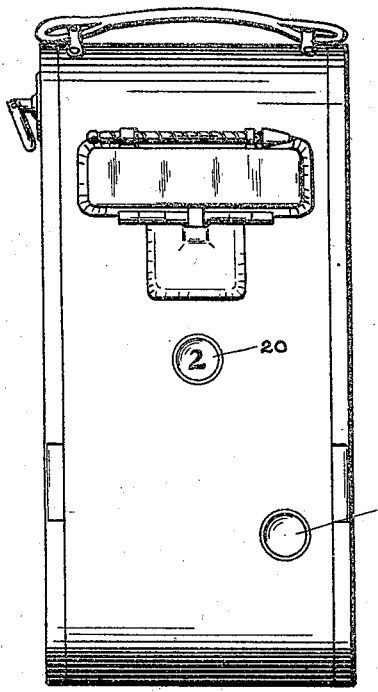
Figure 1 is a rear elevation of a camera equipped with the camera attachment.
Figure 2:
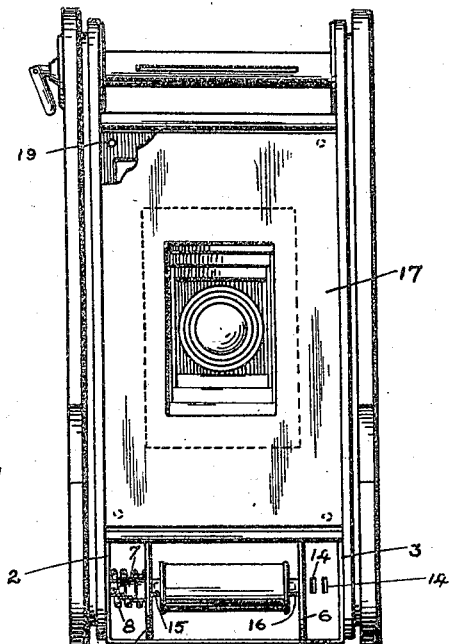
Figure 2 is a rear elevation of the same camera with the back of the camera removed therefrom, showing the attachment in place in the camera.
Figure 4:
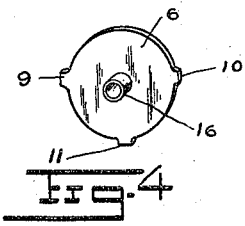
Figure 4 is a detail perspective view of one of the adjustable members of the camera attachment.
Figure 5:
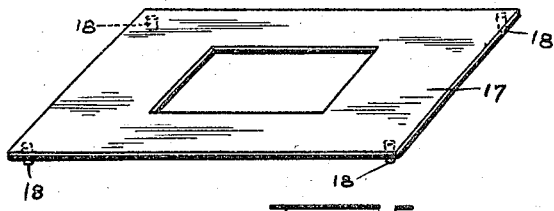
Figure 5 is a detail perspective view of one of the mats used in connection with the camera attachment.
Figure 3:
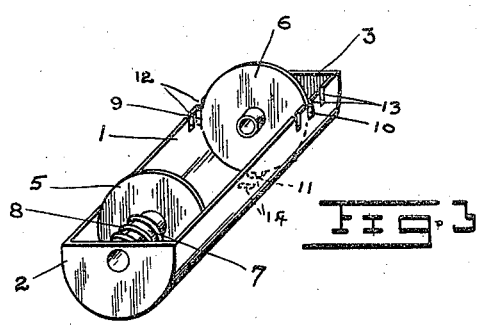
Figure 3 is a detail perspective view of the attachment illustrated in Figure 2.

Folding cameras of the kodak type are made in several standard sizes each being designed for the making of but one size picture. My present invention is intended to make such a camera adaptable for the smaller standard sizes of films other than the size for which the camera is constructed. Thus a camera constructed for the making of pictures of postal card size can be used for the making of pictures on vest pocket camera film with the attachment forming the subject matter of my invention.

This attachment comprises a semi-circular trough 1 that is closed at the ends by the plates 2 and 3. The trough is placed into the film pocket 4 of the camera and the end plates are provided with suitable holes into which the pivot pins of the film pocket can extend and hold the trough in place in the pocket instead of a film spool. These pivot pins are provided for holding the full sized film spool in the pocket when the attachment is not used. In the trough 1 are mounted two discs 5 and 6. Of these the disc 5 is mounted on the outer end of a collapsible tube 7, the disc and the tube being mounted on the end plate 2. A coil spring surrounds the collapsible tube 7 and extends between the inside of the end plate 2 and the disc 5 to normally force this disc against one end of the spool of film placed into the trough.

For the purpose of holding the film spool centrally in the trough 1 a second disc 6 is mounted therein. This second disc is adjustable in the trough 1, lugs 9, 10 and 11 being provided on the periphery of the disc that are adapted to engage into the notches 12, 13 and 14 in the sides and bottom of the trough. A series of such notches are provided in the trough that makes it possible to place the disc into different positions in the trough and hold it stationary in place therein. These notches are spaced according to the standard dimensions of the different sizes of film spools that can be used in the attachment for taking pictures smaller than the camera originally was intended for.

The discs 5 and 6 are provided with the pivot pins 15 and 16 respectively. These pivot pins engage into the central bearings provided in the film spools, and hold these spools centrally in the trough 1 in the same way in which the correct size film is held in the pockets of the camera by the bearing pins provided at each end thereof.

In using small size film in the camera it is necessary to correspondingly close the opening in the back of the camera. For this purpose a mat 17 having an opening corresponding to the size of the film mounted in the trough 1 is placed over the opening in the back of the camera. This mat may be made of any desirable sheet material cut to the required size and having the proper opening cut into the middle thereof. The mat is held in place on the camera by four pins or pegs 18, 18. These pins are adapted to engage into suitable holes 19 provided in the camera and thus hold the mat against movement when the film passes over it.

The films are centered over the opening in the mat by means of the colored window 20 located in the middle of the back of the camera. For this reason the back of the film used with the attachment must be marked correspondingly, that is, each section of the film must have its number printed centrally of the section of the film and not at one side and near one end thereof as is the practice at the present time. The window indicated by reference numeral 21 may be left in the back of the camera when using a film that can be mounted in the camera without the attachment above described.

I claim:

1. A camera attachment comprising a trough adapted to be mounted in the film pocket of a camera, a pair of discs mounted transversely in said trough so as to engage the ends of a film spool, yielding means to normally force one of said discs toward the middle of said trough from one end thereof, adjustable means adapted to hold the other of said discs in a predetermined position in said trough near the other end thereof.

2. A camera attachment comprising a trough adapted to be mounted in the film pocket of a camera, said trough having a series of openings therein, a disc having a series of projections formed on the periphery thereof adapted to engage into the openings in said trough and hold said disc in a predetermined fixed position in said trough near one end thereof, a telescoping sleeve mounted at the other end of said trough, a second disc carried on the end of said telescoping sleeve, a spring interposed between the inside of said second disc and the end of said trough to normally force said telescoping sleeve with said second disc toward the middle of said trough, said disks being mounted transversely in said trough so as to engage the ends of a film spool.

In testimony whereof I affix my signature.

JULES ABELES.